H. E. GRABAU & A. C. SCHWARTZ.
METHOD OF MAKING TIRE CASINGS.
APPLICATION FILED FEB. 8, 1917.

1,227,427.

Patented May 22, 1917.
2 SHEETS—SHEET 1.

Inventors
Hans E. Grabau
A Charles Schwartz
By Sheffield & Betts
Attorneys

H. E. GRABAU & A C. SCHWARTZ.
METHOD OF MAKING TIRE CASINGS.
APPLICATION FILED FEB. 8, 1917.
1,227,427.
Patented May 22, 1917.
2 SHEETS—SHEET 2.
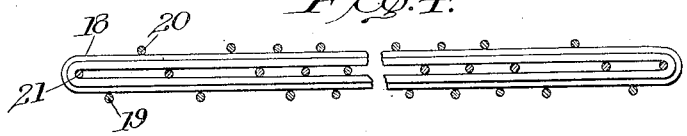
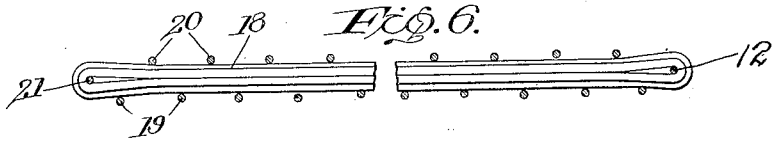
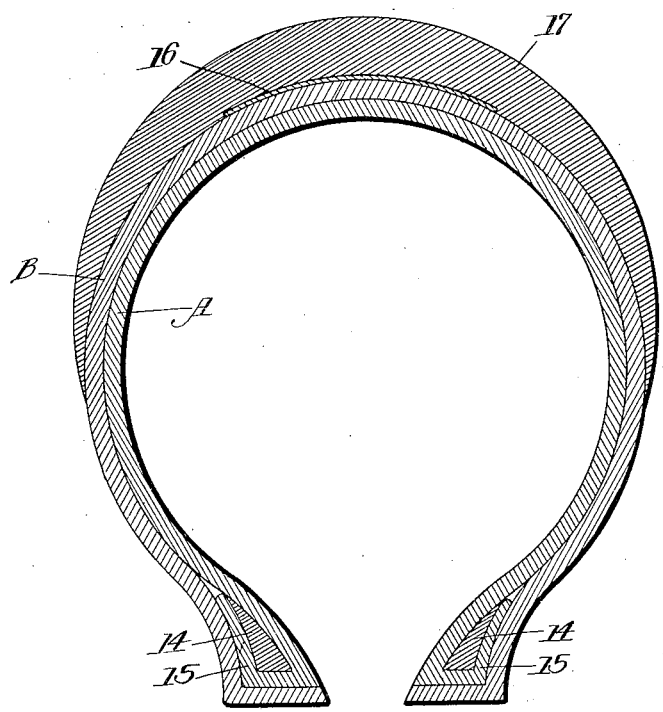
Inventor
Hans E. Grabau
A. Charles Schwartz
By Sheffield & Betts
Attorneys

UNITED STATES PATENT OFFICE.

HANS E. GRABAU, OF LONG ISLAND CITY, AND A CHARLES SCHWARTZ, OF NEW YORK, N. Y.; SAID GRABAU ASSIGNOR TO SAID SCHWARTZ.

METHOD OF MAKING TIRE-CASINGS.

1,227,427.  Specification of Letters Patent.  Patented May 22, 1917.

Application filed February 8, 1917. Serial No. 147,370.

*To all whom it may concern:*

Be it known that we, HANS E. GRABAU, who resides in Long Island City, county of Queens, State of New York, and A CHARLES SCHWARTZ, who resides in the borough of Manhattan, city, county, and State of New York, have invented certain new and useful Improvements in Methods of Making Tire-Casings, of which the following is a description.

In our copending application Serial No. 147,369 filed February 8, 1917, we have described and claimed a tire embodying in its contruction a novel tire fabric. The claims of our present application are directed particularly to methods employed in the manufacture of tires of this type.

Referring to the drawings,

Fig. 4 is a sectional view taken substantially on the line 4—4 of Figs. 1 and 2;

Fig. 5 is a similar sectional view taken on the line 5—5 of Figs. 1 and 2;

Fig. 6 is a sectional view similar to Figs. 4 and 5 showing a modified form of fabric;

Fig. 7 is a transverse sectional view through a tire casing showing the manner of arranging the strips of fabric.

It has been found that the major portion of the stress upon a tire is the bursting stress, which is due to the air pressure within, and which is resisted by the transverse strength of the tire or carcass. The longitudinal stress, due to the traction of the tire upon the road, is relatively small, and therefore the longitudinal strength of the tire need not be as great as its transverse strength. In order to provide a tire which shall have maximum strength where required, with a minimum amount of material, we employ a tire fabric so constructed that the material is for the most part concentrated in the transverse strands, the longitudinal threads being of just sufficient number and size to resist the relatively small longitudinal stress encountered.

Figure 1:
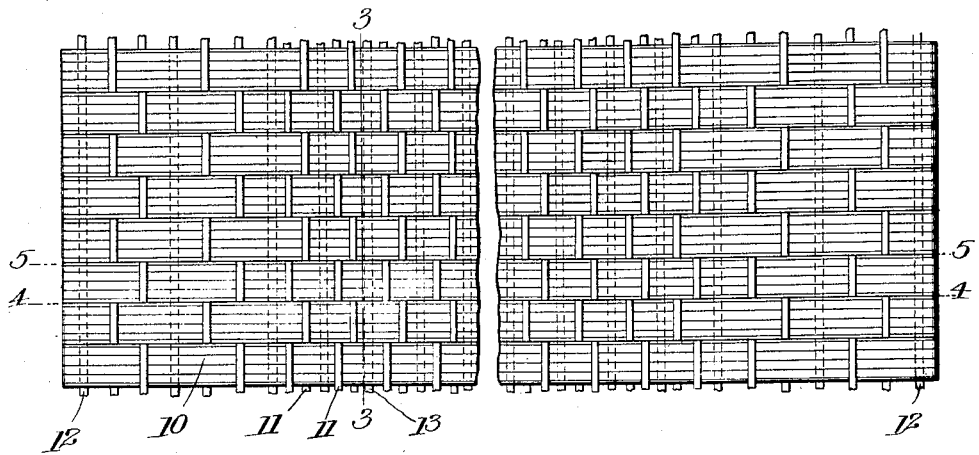
Figure 1 is a plan view of a portion of a strip of fabric with the longitudinal threads and transverse strands at right angles to each other.

As will be seen by reference to Fig. 1, our improved fabric is composed of transverse strands 10, which may constitute the weft, and which are of relatively great diameter and strength, and are placed as closely together as possible, and of relatively small longitudinal threads 11 of small diameter, which may constitute the warp, and which are spaced apart and interwoven with the transverse strands 10. Each strand 10 preferably consists of a plurality of threads or members, which may be parallel, as indicated in the drawing.

It is evident that this fabric has great transverse strength, not only because of the fact that the transverse strands themselves are strong and of large diameter, but also because of the fact that the use of warp or longitudinal threads of small diameter results in there being a maximum number of transverse strands per unit length of material. Obviously, the number of transverse strands per unit length, and hence the strength of the material, increases as the distance between the strands is decreased by decreasing the size of the longitudinal threads. We therefore employ longitudinal threads of a size just sufficient to give the necessary longitudinal strength to the material; and as above pointed out, the required longitudinal strength is slight as compared to the required transverse strength.

We have found a convenient and satisfactory method of weaving the above-described fabric, to consist in passing between alternate warp threads a continuous thread, over and back around edge threads, such as indicated at 12 in Fig. 6, a sufficient number of times, until the strand is of required size. When this is completed, the warps are reversed and the operation is repeated until the next strand is of the desired size, and so on. Each strand is, therefore, in reality a coil, and its upper and lower halves may, if desired, be separated by intermediate warps 13, shown in Figs. 4 and 5, and similar to the edge threads 12. These intermediate warps are, however, not considered necessary or desirable except for extremely large sizes, in which case the fabric is preferably woven in three or four or more plies, with intermediate warps between each two.

Obviously, other methods may be employed for weaving the fabric. For example, instead of building up the transverse strands in the course of the weaving they may be previously built up of a plurality of threads or members, either partially or entirely to the required size, before being interwoven with the warp threads. In any event, it is apparent that the resulting fabric is not only extremely strong transversely, and sufficiently strong longitudinally, but is also very pliable, which is an important quality of tire fabric.

Figure 2:
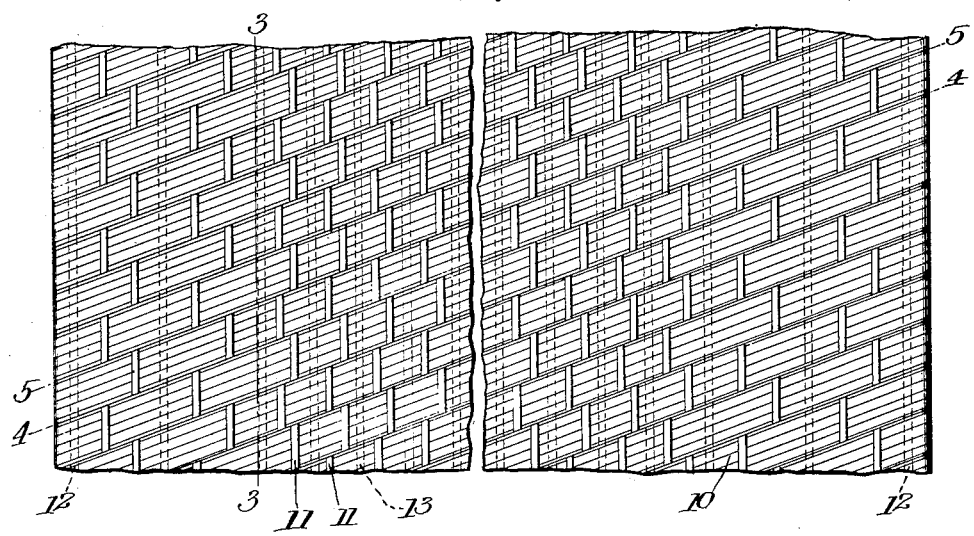
Fig. 2 is a similar view but showing the strands arranged obliquely.
Figure 3:
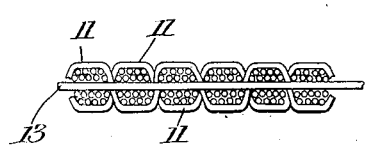
Fig. 3 is a sectional view taken substantially on the line 3—3 in Fig. 1 or 2.

We have found that tires made by applying to the tire core one or more layers of the above described fabric in such a way that the transverse strands are disposed at right angles to the longitudinal threads and to the longitudinal axis of the tire, are eminently satisfactory, as clearly pointed out in our aforesaid application. However, in some cases we have found it desirable, in order to increase the longitudinal strength of the tire without increasing the number or size of the longitudinal threads, to so arrange the tire fabric that the transverse strands are oblique to the longitudinal axis of the tire. In order to do this while still maintaining the longitudinal threads parallel to the longitudinal axis of the tire, it is necessary to produce a strip of fabric having the transverse strands oblique to the longitudinal threads, as indicated in Fig. 2.

One way in which this may be accomplished is by weaving a strip of the desired width on a loom which will arrange the transverse strands or the weft obliquely with respect to the longitudinal or warp threads. However, as the fabric is soft and the strands and warp threads will not maintain the relative oblique relation, it is necessary to treat the fabric as thus woven to retain the strands and threads in the desired positions. In manufacturing the casing it is necessary to coat the strips with rubber or rubber cement, and this may be done immediately after the weaving, thus holding the strands oblique relative to the warp threads. Another method of making the strips with oblique or diagonal strands consists in weaving the same in the usual manner with the strands and warp threads running at right angles to each other, then moving one edge of the strip longitudinally relative to the other to thereby arrange the strands obliquely. This may be accomplished by applying a force at two diagonally opposite corners of the strip, said forces acting substantially parallel with the longitudinal threads, or by temporarily securing the edges of the strip to longitudinal members, and forcibly moving one of said members longitudinally with respect to the other. The strip while held distorted may then be treated with rubber or rubber cement to fix the strands and threads in the oblique relation. Also the thread of which the fabric is made may be treated with rubber or rubber cement before the fabric is woven.

The strips of fabric, having thus been prepared, the tire may be constructed in the following manner: The inner layer A of the fabric is placed on the core in the usual way, except that its edges preferably surround the inner, lower and outer surfaces of the annular beads 14, as clearly shown at 15 in Fig. 7 of the drawing. The second layer 13 is then superposed upon the inner layer, and its edges are preferably carried around the outside and bottom of the beads 14 as shown, the edges 15 of the layer A lying between the beads and the outer layer, whereby when the whole is vulcanized and welded together under hydraulic pressure, the fabric is firmly anchored to the beads. Preferably, the two strips of fabric are so arranged that the transverse strands thereof are inclined in opposite directions. It is obvious, of course, that any number of layers of fabric, other than two, may be employed, but we have found that two layers produce a very satisfactory result. A narrow breaker strip 16, of any desired kind of fabric, may be arranged outside of the strip B, as indicated, although, it is not necessary. The application of the tread rubber 17 and the vulcanizing of the tire may be accomplished in any convenient manner.

The advantages possessed by our improved tire, over the tires now in common use, both from the standpoint of manufacturing economy and from the standpoint of strength and service, are many, and are set forth more or less in detail in our aforesaid application.

Having thus described the invention, what is claimed and desired to be secured by Letters Patent is:

1. The method of making a strip of tire casing fabric having longitudinal threads and transverse strands extending obliquely with respect to the longitudinal threads and connected by the latter, which consists in forming the fabric with the strands and longitudinal threads extending substantially at right angles, causing the strands to assume positions oblique to the longitudinal threads, and finally treating the fabric with a substance to maintain the strands and threads in said oblique relation.

2. The method of making a strip of tire casing fabric having longitudinal threads and transverse strands extending obliquely with respect to the longitudinal threads and connected by the latter, which consists in forming the fabric with the strands and longitudinal threads extending substantially at right angles; causing the strands to assume positions oblique to the longitudinal threads, and finally treating the fabric with rubber to maintain the strands and threads in said oblique relation.

3. The method of making a strip of tire casing fabric having longitudinal threads and transverse strands extending obliquely with respect to the longitudinal threads and connected by the latter, which consists in forming the fabric with the strands and longitudinal threads extending substantially at right angles; moving one edge of the strip longitudinally relative to the other to thereby arrange the strands oblique to the longitudinal threads, and finally treating the fabric with a substance to maintain the strands and threads in said oblique relation.

4. The method of making a strip of tire casing fabric having longitudinal threads and transverse strands extending obliquely with respect to the longitudinal threads and connected by the latter, which consists in producing the fabric with the strands oblique to the threads and then treating the same with rubber to maintain the strands and threads in said oblique relation.

HANS E. GRABAU.
A CHARLES SCHWARTZ.